Figure 1:
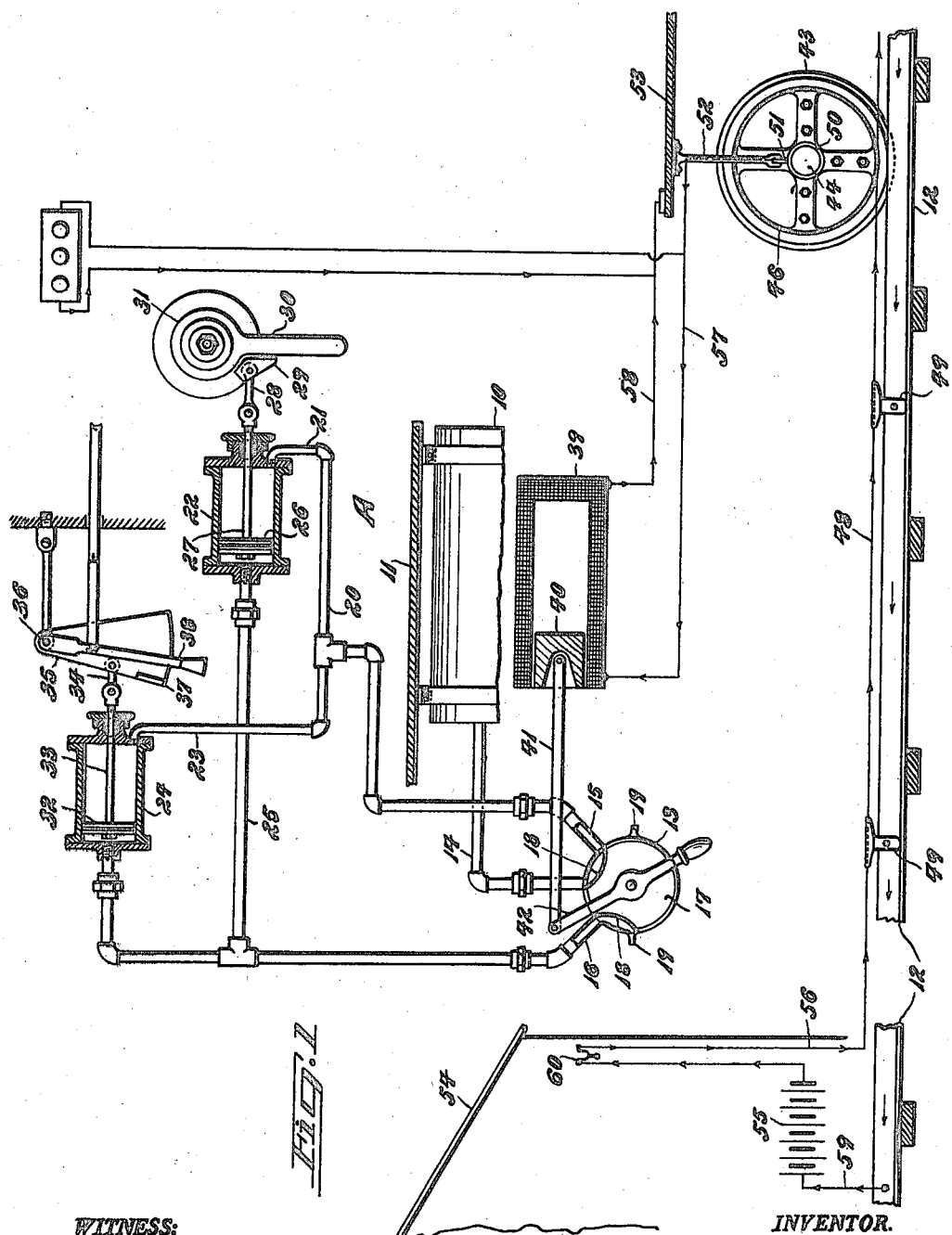

E. A. REBOUL.
TRAIN CONTROLLING MECHANISM.
APPLICATION FILED OCT. 9, 1919.

1,386,656.

Patented Aug. 9, 1921.
2 SHEETS—SHEET 1.

WITNESS:
Alfred T. Bratton

INVENTOR.
Edward A. Reboul
By Victor J. Evans
ATTORNEY.

E. A. REBOUL.
TRAIN CONTROLLING MECHANISM.
APPLICATION FILED OCT. 9, 1919.
1,386,656.
Patented Aug. 9, 1921.
2 SHEETS—SHEET 2.
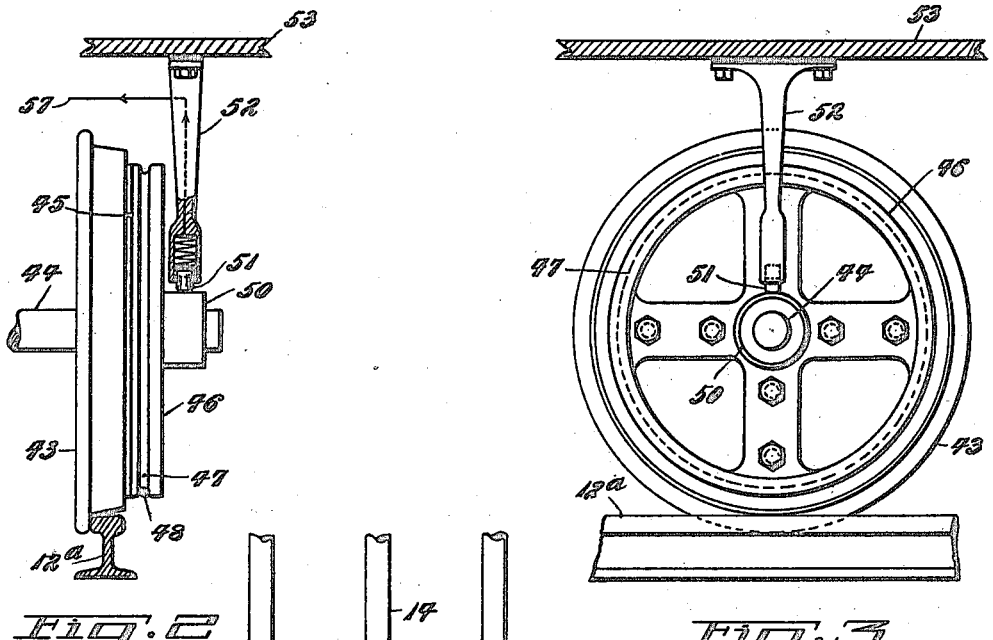
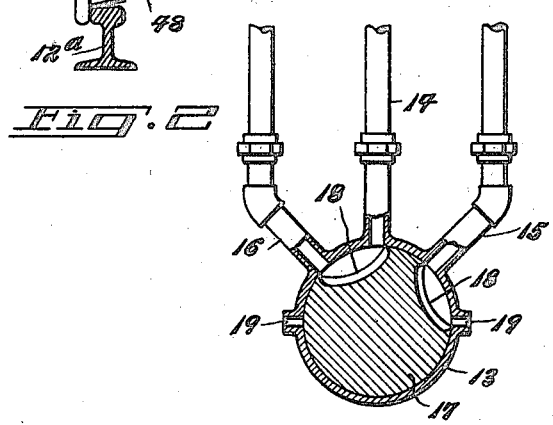
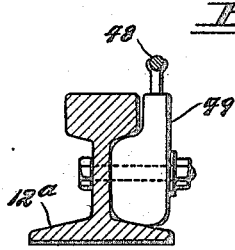
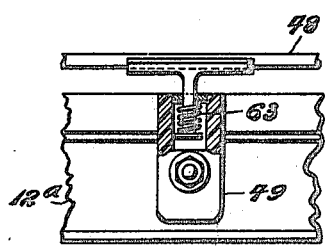
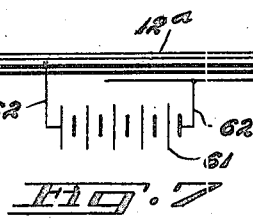
WITNESS:
Alfred T. Britton
Edward A. Reboul
INVENTOR.
BY
Victor J. Evans
ATTORNEY.

UNITED STATES PATENT OFFICE.

EDWARD A. REBOUL, OF PHILADELPHIA, PENNSYLVANIA.

TRAIN-CONTROLLING MECHANISM.

1,386,656.   Specification of Letters Patent.   Patented Aug. 9, 1921.

Application filed October 9, 1919. Serial No. 329,467.

*To all whom it may concern:*

Be it known that I, EDWARD A. REBOUL, a citizen of the United States, residing at Philadelphia, in the county of Philadelphia and State of Pennsylvania, have invented new and useful Improvements in Train-Controlling Mechanism, of which the following is a specification.

The invention relates to train controlling devices and has for an object to provide a mechanism for automatically arresting the movement of a train or other vehicle, operating over a line of way, when a danger condition confronts or precedes the same.

Among other features the invention comprehends the equipping of a locomotive or other vehicle, whether the same be steam, electric or self-propelled, with suitable means, electrically operated for governing the action of the power controlling movement arresting elements of the vehicle, said means being capable of being thrown into active operation to automatically shut off the propelling power of the vehicle and apply the brakes when an electric circuit is closed.

Still further objects of the invention reside in various improvements on a train controlling mechanism for which I duly filed an application for Letters Patent of the United States under date of April 20, 1917, Serial No. 163,455, allowed November 2, 1918.

In the further disclosure of the invention reference is to be had to the accompanying drawings constituting a part of this specification, in which similar characters of reference denote corresponding parts in all the views, and in which,—

Figure 1— is a partial vertical sectional view taken through the mechanism on the vehicle and through the track, showing in diagrammatic form, the electric connections for operating the mechanism on the vehicle.

Fig. 2— is an end elevation of one of the wheels of the truck of the vehicle showing its arrangement upon the rail, shown in cross section, with the brush mechanism also shown partially in section.

Fig. 3— is a face view of the structure shown in Fig. 2.

Fig. 4— is a detail view partially in vertical section, of the valve for the air.

Fig. 5— is a vertical sectional view taken through the rail immediately in front of one of the wire supporting brackets.

Fig. 6— is a face view of the structure shown in Fig. 5, parts being broken away to disclose the underlying structure, and .

Fig. 7— is a plan view showing the use of a flagman's battery, used as a shunt, in connection with my device.

Referring more particularly to the views, the train controlling mechanism A, comprehends a fluid tank or reservoir 10 adapted to be supplied with a suitable fluid such as compressed air obtained from any suitable source, this tank being preferably disposed beneath the floor 11 of the cab of a locomotive or other vehicle, operating over a trackway 12. A two-way valve 13 has a pipe 14 from the tank 10 connected up to the valve and branch pipes 15, 16 are arranged to connect with the valve. The valve proper indicated by the numeral 17 has a plurality of cut out portions 18 which in the throw of the valve, are adapted to provide communicating passages between the pipes 14, 15, and the pipes 14, 16, and the valve is further provided with a plurality of bleed openings 19 and which, through the medium of the cut out portions 18, can provide communication from the pipe 15 to one of the bleed openings or from the pipe 16 to the other bleed opening. The pipe 15 extends upwardly above the floor 11 and connects with a branch pipe 20 which has one end 21 leading to the inner end of a cylinder 22 and the other end 23 leading to the inner end of a cylinder 24. The pipe 16 extends upwardly beyond the floor 11 and projecting therefrom is a branch pipe 25 leading into the outer end of the cylinder 22, the remainder of the pipe 15 connecting with the outer end of the cylinder 24. The cylinder 22 carries a piston 26 on a rod 27, the latter on its outer end connecting with another rod 28 on which is mounted a stop shoe 29. This shoe 29 is adapted to engage with a handle 30 of a valve 31 controlling the air supply to the brakes of the vehicle and when the piston 26 is in one position on the cylinder, the stem thereof projecting from the cylinder, will result in the stop shoe 29 being moved to actuate the valve 31 through the medium of the handle 30 to close the valve 31, which in turn will bring about the operation of the air brakes on the wheels of the vehicle, as will be readily understood, the form of compressed air brake used, being of any standard type. It will be noted that the manual operation of the valve 30 will not be impaired in any manner whatsoever when the piston 26 is in its outermost position in the cylinder, Fig. 1 indicating the open position of the handle 30 of the valve 31. The cylinder 24 is provided with a piston 32 on a rod 33 extending exteriorly of the cylinder to connect with an auxiliary rod 34 which in turn is connected to a quadrant shaped stop shoe 35, pivoted at 36 and having a lug 37 which is adapted to engage the usual stem or other throttle or control lever 38 and actuate the same when the quadrant-like stop shoe 35 is swung in one direction, it being understood that the lever 38 is the controlling lever of the vehicle and as in the case of a steam locomotive, would be the steam throttle. The throttle lever 38 in Fig. 1, is shown in its open position and therefore it will be apparent that the closing of the same will move the lever toward the right so that in the position of the piston 32 shown in Fig. 1, independent manual operation of the lever 38 is possible without interference from the stop shoe 35. Now it will be seen that when the valve 17 is in the position shown in Fig. 1, a quantity of air from the compressed air tank 10, can flow through the pipe 14 and thence by way of one of the cut out portions 18, into the pipe 15 through which the air passes into the pipe 20 and the extended end 23, thus forcing a quantity of air into the cylinders 23, 24, to move their respective pistons 26, 32, to the outer ends of the cylinders and hold them there, thus maintaining the stop shoes 29, 35, in normal non-operating positions. It will also be seen that when the valve 17 is in the position mentioned, any compressed air which had previously been forced through the pipes 16, 25 will be exhausted therefrom, by reason of the other cut out portion 18, establishing communication between the pipe 16 and one of the bleed openings 19. Now when the valve 17 is moved into its other position, the other cut out portion 18 will connect the pipes 14, 16 and establish communication between the pipe 15 and the other bleed opening 19. This will result in the compressed air in the tank 10 passing through the pipe 14 into one of the cut out portions 18 and thence through the pipe 16 and the branch pipe 25, to be emitted into the cylinders 22, 24 at the outer ends thereof and operate against the respective pistons 26, 32, and force the same inwardly thus moving the stop shoe 29 against the lever 30 to actuate the valve 31 and close the same, and move the stop shoe 35 against the throttle lever 38 and actuate it to cut off the supply of power to the vehicle. At the moment that the valve is moved into the position to bring about this result, it will be seen that the other cut out portion 18 will establish communication between the pipe 15 and the other bleed opening 19 and thus any compressed air that has been contained in the cylinders 22, 24, in front of the pistons 26, 32, will escape into the pipes 20, 23, and thence into the pipe 15 from which the compressed air will pass, through the cut out portions 18 and thence out into the atmosphere through the bleed opening 19, thereby relieving the pistons of any pressure on the sides thereof, opposite to the sides receiving the impact of the incoming compressed air to actuate the pistons. Operation of the valve 17 to bring about a reciprocating movement thereof takes place by reason of a solenoid 39 which has its core 40 connected to a lever 41, in turn connected to a valve lever 42 of the valve 17, electric operation of the solenoid resulting in movement of the valve to establish communication between the pipes 14, 15 or the pipes 14, 16 and also with the bleed openings 19, thus bringing about the operation of the pistons in their cylinders to move the stop shoes into the desired positions to accomplish the result mentioned heretofore.

The numeral 12$^a$ indicates one of the rails of the trackway 12 and 43 one of the truck wheels of the vehicle operating over the rail 12$^a$. This truck wheel is mounted on the usual axle 44 and connected to the outer face of the wheel 43 and insulated therefrom by a suitable insulating disk 45 or the like, is a circular contact band or element 46, the latter having an annular or peripheral groove 47 for accommodation with a feeding wire 48 which is strung adjacent the rail 12$^a$ and supported on suitable insulating brackets 49 which fit against the outer face of the rail and are securely bolted or otherwise secured thereto, the band or element 46 being in the nature of a contact shoe. This element or contact shoe 46 has a hub 50 which is also in the nature of a contact shoe and which is engaged by a spring actuated brush 51 depending from the bracket 52 on the under-side of a truck frame 53 and insulated therefrom. The numeral 54 designates a despatcher's tower or power house and contains a battery 55 which has a wire 56 connecting with the feed wire 48 running alongside of the rail 12$^a$, thus carrying a current to the element 46 from which it passes through the hub 50 to the contact brush 51 and thence to a wire 57 which in turn connects with the solenoid 39. A return wire 58 has connection with the solenoid 39 and is connected to the frame 53 of the truck through which the current will pass to the rail 12$^a$ which acts as the return and therefore has a wire 59 connecting with the battery 55, to complete the circuit. A switch 60 is provided in the despatcher's tower and established in the electric circuit, normally breaking the same. Now if the train or vehicle should pass a block such as the signal system now generally used on railroads, the despatcher in the tower by throwing the switch, can complete the electric circuit to the vehicle, bringing about operation of the solenoid 39 which actuates the valve 17, causing the compressed air to be released from the tank 10 to actuate the pistons 26, 32, and thus throw the compressed air brake lever 30 into closed position and also simultaneously move the throttle lever 38 to shut off the supply of motive power to the vehicle.

In certain instances it may occur that a train is held in a block and because of the fact that another train is due shortly thereafter on the same track, coming in the same direction, it is desirable to bring the other train to a halt to avoid a rear end collision. This is usually accomplished by sending a flagmen to hold the flag before the oncoming train. In the present instance however, as shown in Fig. 7, I provide a battery 61, having connecting wires or terminals 62 and this battery can be carried on the train in the possession of the flagman. Now when he is sent back to stop the oncoming train, it is only necessary for him to connect one of the terminals on the battery with the feed wire 48 and the other with one of the rails 12ᵃ, thus completing an electric circuit to the air and throttle mechanism of the oncoming train and accomplishing the operation thereof in the manner stated heretofore.

It will be observed by reference to Fig. 6, that the brackets 49 are each preferably spring mounted as at 63, this being desirable to adjust the brackets to the contour or line of the trackway and also provide sufficient give to the feed wire 48 so that the same will have proper contact with the contact shoe or element 46 as the train or vehicle speeds over the trackway.

It is of course understood that the electric circuit structure set forth, can be divided up into various sections, one insulated from the other with each section, for a certain distance to each side of the despatcher's tower, in the control of the despatcher in that tower, and so on throughout the length of the railway.

From the foregoing description, it will be seen that the mechanism set forth is in fact a combination of an electric system with an air controlled system, and the simplicity of the latter makes it possible to attach the same to the rolling stock of the railway, either steam or electric, without necessitating very serious alterations or the provision of an expensive equipment, the use of one of the rails for the return of the current being also desirable to minimize as much as possible, the installation, although it will of course be understood that a separate return wire could be provided if desired.

It will be understood that I do not limit myself to the particular construction set forth herein and shown in the drawings; that various slight changes may be made without departing from the spirit of the invention and that the scope of the invention is defined in the appended claim.

Having described my invention, I claim,—

A train control device comprising the combination with the throttle lever and air brake control valve, of a compressed air reservoir, a two-way valve connected with the reservoir, cylinders associated respectively with the throttle lever and brake control valve, pistons within said cylinders connected respectively with the throttle and brake valve, pipes leading from said two-way valve to one end of said cylinders, other pipes leading from said two-way valve to the other ends of said cylinders, a solenoid having a movable core connected with said two-way valve whereby to control the latter, and track carried means for passing a current through the solenoid.

In testimony whereof I affix my signature.

EDWARD A. REBOUL.